US012625508B2

(12) United States Patent
Chen et al.

(10) Patent No.: US 12,625,508 B2
(45) Date of Patent: May 12, 2026

(54) CONTROL SYSTEM AND CONTROL METHOD FOR FLIGHT VEHICLE

(71) Applicant: INDUSTRIAL TECHNOLOGY RESEARCH INSTITUTE, Hsinchu (TW)

(72) Inventors: Cheng-Ta Chen, Hukou Township (TW); Yin-Ling Kuo, Hsinchu City (TW); Wen-Chuan Chen, Hukou Township (TW); Hu-Hsuan Tsui, Keelung City (TW); Feng-Chi Lee, Lunbei Township (TW); Ding-Huang Yeh, Zhudong Township (TW); Chia-Ming Liang, Taipei City (TW); Ya-Ting Yang, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 232 days.

(21) Appl. No.: 18/535,022

(22) Filed: Dec. 11, 2023

(65) Prior Publication Data

US 2025/0189993 A1     Jun. 12, 2025

(51) Int. Cl.
*G05D 1/87*       (2024.01)
*G05D 1/86*       (2024.01)
*G05D 109/20*     (2024.01)

(52) U.S. Cl.
CPC ................ *G05D 1/87* (2024.01); *G05D 1/86* (2024.01); *G05D 2109/20* (2024.01)

(58) Field of Classification Search
CPC ......... G05D 1/87; G05D 1/86; G05D 2109/20
See application file for complete search history.

(56) References Cited

U.S. PATENT DOCUMENTS

| | | | |
|---|---|---|---|
| 5,809,220 A | 9/1998 | Morrison et al. | |
| 2007/0033435 A1* | 2/2007 | Stange | G05B 9/03 |
| | | | 714/15 |

(Continued)

FOREIGN PATENT DOCUMENTS

| | | |
|---|---|---|
| CN | 105334863 A | 2/2016 |
| CN | 106802661 A | 6/2017 |

(Continued)

OTHER PUBLICATIONS

Backes et al., "Requirements Analysis of a Quad-Redundant Flight Control System", Conference: NASA Formal Methods Symposium, Feb. 2015, pp. 1-15.

(Continued)

*Primary Examiner* — Thomas Ingram
(74) *Attorney, Agent, or Firm* — Birch, Stewart, Kolasch & Birch, LLP

(57) ABSTRACT

A control system for controlling a flight vehicle, includes the following elements. A first buffer, coupled to a motor unit of the flight vehicle. A second buffer, coupled to the motor unit. A master control unit, for generating a first actuation signal, the first actuation signal is selectively provided to the motor unit through the first buffer. A slave control unit, for generating a second actuation signal, the second actuation signal is selectively provided to the motor unit through the second buffer. A logic determination unit, for generating a switch control signal to control the first buffer and the second buffer to be turned ON or turned OFF. The master control unit and the slave control unit monitor each other for abnormality, when the master control unit is abnormal, the second actuation signal is provided to the motor unit in response to the switch control signal.

22 Claims, 5 Drawing Sheets

(56) References Cited

U.S. PATENT DOCUMENTS

| | | | | |
|---|---|---|---|---|
| 2009/0132765 | A1 | 5/2009 | Wang et al. | |
| 2011/0248121 | A1* | 10/2011 | Hirvonen | B64C 13/505 |
| | | | | 244/194 |
| 2019/0079513 | A1* | 3/2019 | Greenfield | G06F 11/20 |
| 2019/0340090 | A1* | 11/2019 | Grabs | G05D 1/0077 |
| 2022/0227483 | A1* | 7/2022 | Scanlan | B64C 13/50 |
| 2022/0271854 | A1 | 8/2022 | Maruyama et al. | |
| 2023/0149762 | A1 | 5/2023 | Willison et al. | |
| 2024/0166377 | A1* | 5/2024 | Dinu | B64G 1/244 |
| 2024/0402732 | A1* | 12/2024 | Takahashi | B60W 50/045 |
| 2025/0138529 | A1* | 5/2025 | Lin | G05D 1/101 |

FOREIGN PATENT DOCUMENTS

| | | | |
|---|---|---|---|
| CN | 107848623 | A | 3/2018 |
| CN | 111386217 | A | 7/2020 |
| CN | 112173078 | A | 1/2021 |
| CN | 114384922 | A | 4/2022 |
| EP | 3 514 644 | B1 | 11/2022 |
| TW | 1704464 | B | 9/2020 |
| WO | WO 2015/157883 | A1 | 10/2015 |
| WO | WO 2021/212325 | A1 | 10/2021 |

OTHER PUBLICATIONS

Fleck, "Redundancy Techniques for Reliable Flight-Control Computers", IEEE Xplore, Sep. 1963, pp. 535-546.
Gong et al., "Design and Comparison of Flight-Control-System Redundancy", IEEE Xplore, 2012, pp. 1130-1134.
McGough et al., "Digital Flight Control System Redundancy Study", Air Force Flight Dynamics Laboratory, Jul. 1974, total 341 pages.
Taiwanese Office Action and Search Report for Taiwanese Application No. 112148014, dated Oct. 1, 2024.

* cited by examiner

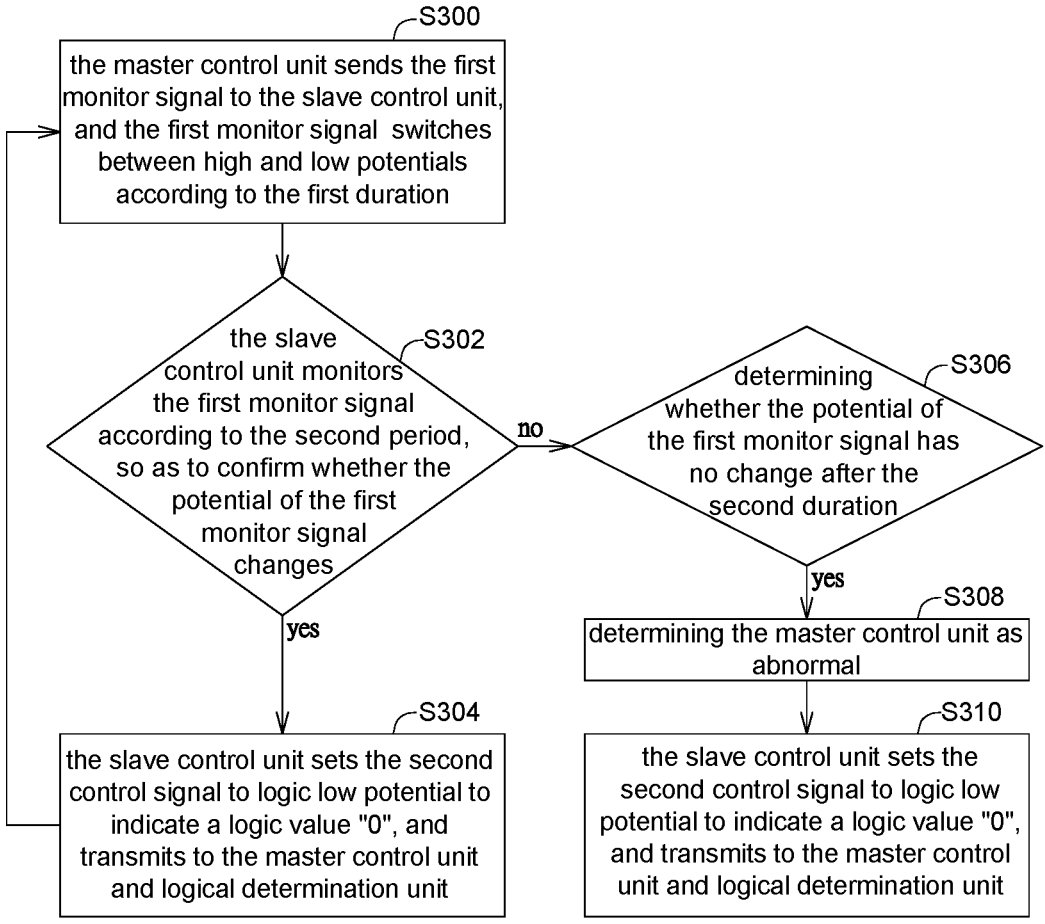

S300
the master control unit sends the first monitor signal to the slave control unit, and the first monitor signal switches between high and low potentials according to the first duration S302
the slave control unit monitors the first monitor signal according to the second period, so as to confirm whether the potential of the first monitor signal changes no S306
determining whether the potential of the first monitor signal has no change after the second duration yes S308
determining the master control unit as abnormal yes S304
the slave control unit sets the second control signal to logic low potential to indicate a logic value "0", and transmits to the master control unit and logical determination unit S310
the slave control unit sets the second control signal to logic low potential to indicate a logic value "0", and transmits to the master control unit and logical determination unit

FIG. 3

CONTROL SYSTEM AND CONTROL METHOD FOR FLIGHT VEHICLE

TECHNICAL FIELD

The present disclosure relates to a control mechanism of a vehicle, and in particular relates to a control system and control method of a flight vehicle.

BACKGROUND

In order to maintain a stable navigation of a vehicle, two or more control units may be provided in a control platform of the vehicle to support each other. When an abnormality occurs in one of the control units, control authority may be seamlessly switched to another control unit, so as to ensure that the vehicle may be under control of at least one control unit at any time point without control interruption.

For vehicles navigating on the ground or on the water, a slight control interruption may be tolerated. But, for a flight vehicle in the air, a slight control interruption may cause the flight vehicle to stall and fall. Flight vehicle are usually equipped with more than two control units to support each other. However, the two control units may have excessive control feedback from each other, causing excessive corrections in flight and hence leading to stall.

Therefore, it is desirable to have an improved control mechanism, such that two control units of the flight vehicle may monitor and coordinate with each other, ensuring seamless switching of the two control units.

SUMMARY

According to one embodiment of the present disclosure, a control system for controlling a flight vehicle is provided. The control system includes the following elements. A first buffer, coupled to a motor unit of the flight vehicle. A second buffer, coupled to the motor unit. A master control unit, for generating a first actuation signal, the first actuation signal is selectively provided to the motor unit through the first buffer. A slave control unit, for generating a second actuation signal, the second actuation signal is selectively provided to the motor unit through the second buffer. A logic determination unit, for generating a switch control signal to control the first buffer and the second buffer to be turned ON or turned OFF. The master control unit and the slave control unit monitor each other for abnormality, when the master control unit is abnormal, the second actuation signal is provided to the motor unit in response to the switch control signal.

According to another embodiment of the present disclosure, a control method for controlling a flight vehicle is provided. The control method includes the following steps. Generating a first actuation signal, by a master control unit. Selectively providing the first actuation signal to a motor unit, by a first buffer. Generating a second actuation signal, by a slave control unit. Selectively providing the second actuation signal to the motor unit, by a second buffer. Generating a switch control signal to control the first buffer and the second buffer to be turned ON or turned OFF, by a logic determination unit. The master control unit and the slave control unit monitor each other for abnormality, when the master control unit is abnormal, the second actuation signal is provided to the motor unit in response to the switch control signal.

BRIEF DESCRIPTION OF THE DRAWINGS

FIG. 3 is a flow chart in which the slave control unit monitors the first monitor signal to determine whether the master control unit is normal.

Figure 1:
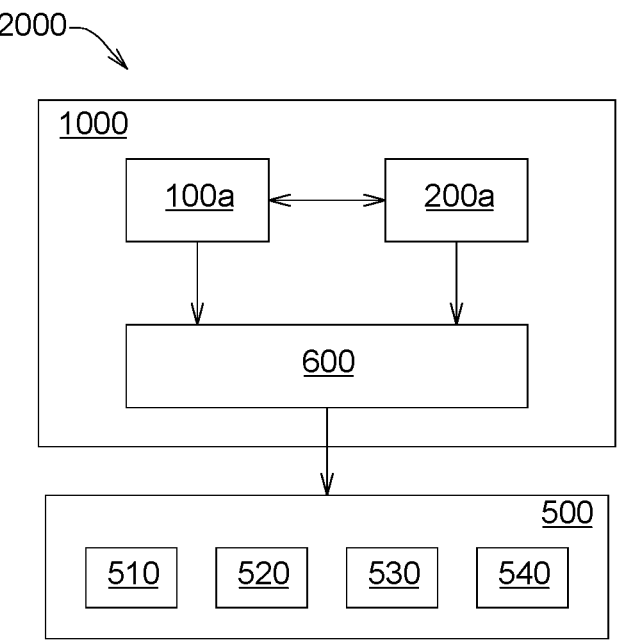
FIG. 1 is a block diagram of a flight vehicle platform according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is a block diagram of a flight vehicle platform 2000 according to an embodiment of the present disclosure. As shown in FIG. 1, the flight vehicle platform 2000 includes a control system 1000 and peripheral elements 500. The flight vehicle platform 2000 is disposed in a flight vehicle and used to control a flight function and peripheral functions of the flight vehicle. The flight vehicle is, e.g., various types of UAVs (Unmanned Aerial Vehicle), including ones of various sizes for military or civilian use. The control system 1000 includes two flight management units (FMU) 100a and 200a. The FMU 100a and the FMU 200a support each other to control the flight functions of the flight vehicle. In addition, the FMU 100a and the FMU 200a may also assist to control peripheral functions of the flight vehicle (e.g., photography, cargo loading/unloading, and weapon control, etc.).

The control system 1000 further includes an input/output switch bus (I/O switch bus) 600, and the FMUs 100a and 200a control the peripheral elements 500 of the flight vehicle through the I/O switch bus 600. The peripheral elements 500 include, e.g., a motor unit 510, an actuator 520, a camera 530 and a sensor 540. The motor unit 510 is a servo motor module used to provide power to the flight vehicle to perform flight functions. The actuator 520 is used to adjust the flight attitude of the flight vehicle and the power output of the motor unit 510. In addition, the flight vehicle platform 2000 may further include a remote control module and a power module (not shown in FIG. 1).

Figure 2:
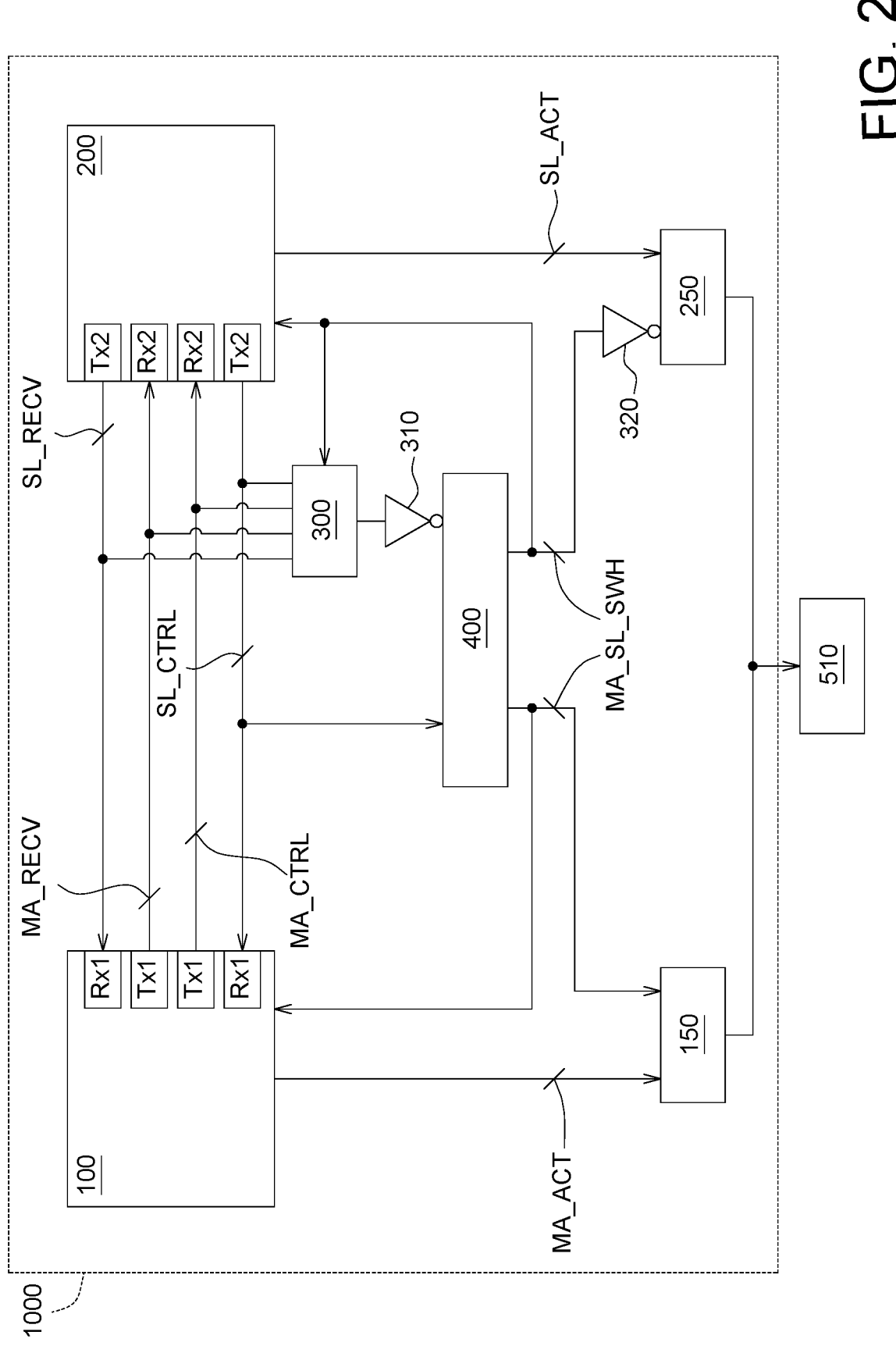
FIG. 2 is a detailed functional block diagram of the control system of FIG. 1.

FIG. 2 is a detailed functional block diagram of the control system 1000 of FIG. 1. The control system 1000 in FIG. 2 includes a master control unit 100, a slave control unit 200, a relay element 300, inverters 310 and 320, a logic determination unit 400, a first buffer 150 and a second buffer 250. The control system 1000 is used to control the motor unit 510 (in FIG. 2, the I/O switch bus 600 of FIG. 1 is omitted). The master control unit 100 and the slave control unit 200 in FIG. 2 are respectively the two FMUs 100a and 200a of the control system 1000 in FIG. 1.

Each of the master control unit 100 and the slave control unit 200 may be a micro control unit (MCU), such as a 32-bit processor with ARM (Advanced RISC Machine) architecture. Alternatively, each of the master control unit 100 and the slave control unit 200 may be a central processing unit (CPU) or a field programmable gate array (FPGA). In operation, the master control unit 100 and the slave control unit 200 exchange data with each other to monitor whether the other party is abnormal.

More specifically, the master control unit 100 is provided with a transmitting circuit Tx1 and a receiving circuit Rx1, and correspondingly, the slave control unit 200 is provided with a transmitting circuit Tx2 and a receiving in circuit Rx2. The master control unit 100 transmits a first monitor signal MA_RECV to the slave control unit 200 through the transmitting circuit Tx1, and the slave control unit 200 receives the first monitor signal MA_RECV through the receiving circuit Rx2. In this embodiment, the first monitor signal MA_RECV is, e.g., a signal periodically switching between high and low potentials, e.g., a clock signal. When the first monitor signal MA_RECV is a clock signal, the first monitor signal MA_RECV has a first period P1, and the first period P1 is equal to e.g., 2 ms. From another point of view, the first monitor signal MA_RECV switches between high and low potentials according 10) to the first duration T1. The first monitor signal MA_RECV switches from high potential to low potential or from low potential to high potential with interval of the first duration T1. The first duration T1 is half of the first period P1 (i.e., the first duration T1 is equal to 1 ms).

The slave control unit 200 monitors the first monitor signal MA_RECV, and determines whether the master control unit 100 is normal based on the first monitor signal MA_RECV. FIG. 3 is a flow chart in which the slave control unit 200 monitors the first monitor signal MA_RECV to determine whether the master control unit 100 is normal. Please refer to FIGS. 2 and 3, firstly, in step S300, the master control unit 100 sends the first monitor signal 20) MA_RECV to the slave control unit 200. The first monitor signal MA_RECV switches between high and low potentials according to the first duration T1. The slave control unit 200 receives the first monitor signal MA_RECV.

Next, in step S302, the slave control unit 200 monitors the first monitor signal MA_RECV according to the second period P2, so as to confirm whether the potential of the first monitor signal MA_RECV changes. In this embodiment, the second period P2 is smaller than the first period P1. For example, the second period P2 is equal to 1 us. The slave control unit 200 confirms the first monitor signal MA_RECV per each of the second period P2, to confirm whether the potential of the first monitor signal MA_RECV changes from high potential to low potential, or from low potential to high potential.

If the confirmation result of step S302 is "yes" (i.e., it is confirmed that the potential of the first monitor signal MA_RECV changes in the second period P2), it may be determined that the master control unit 100 is normal, and then step S304 is executed: the slave control unit 200 sets the second control signal SL_CTRL to a logic low potential "L" to indicate a logic value "0", and the slave control unit 200 transmits the second control signal SL_CTRL to the master control unit 100 and logic determination unit 400 through the transmitting circuit Tx2. Furthermore, step S300 is re-executed: the master control unit 100 continues to send the first monitor signal MA_RECV to the slave control unit 200, and the first monitor signal MA_RECV switches between high and low potentials according to the first duration T1.

On the other hand, if the confirmation result of step S302 is "no" (i.e., 20) in the second period P2, no change in the potential of the first monitor signal MA_RECV is confirmed), then step S306 is executed: determining whether the potential of the first monitor signal MA_RECV has no change after the second duration T2. The second duration T2 is slightly greater than the first duration T1, and the second duration T2 is, e.g., 1.2 ms.

If the confirmation result of step S306 is "yes" (i.e., the potential of the first monitor signal MA_RECV has not changed after the second duration T2), then, in step S308 it is determined that the master control unit 100 is abnormal, and then executing step S310: the slave control unit 200 sets the second control signal SL_CTRL to a logic high potential "H" to indicate a logic value "1", and the slave control unit 200 transmits the second control signal SL_CTRL to the master control unit 100 and the logic determination unit 400 through the transmitting circuit Tx2.

The second control signal SL_CTRL is directly transmitted to the logic determination unit 400 (without passing through the relay element 300 and the inverter 310). The logic determination unit 400 transfers the control authority of the flight vehicle from the master control unit 100 to the slave control unit 200 according to the second control signal SL_CTRL.

Please refer to FIG. 2 again, the slave control unit 200 transmits the second monitor signal SL_RECV to the master control unit 100 through the transmitting circuit Tx2. In this embodiment, the second monitor signal SL_RECV is similar to the first monitor signal MA_RECV. The second monitor signal SL_RECV is also a clock signal which periodically switches between high and low potentials. The period of the second monitor signal SL_RECV is also equal to the first period P1 (i.e., 2 ms). The second monitor signal SL_RECV switches from high potential to low potential or from low potential to high potential for each of the first duration T1.

The master control unit 100 receives the second monitor signal SL_RECV through the receiving circuit Rx1. The master control unit 100 monitors the second monitor signal SL_RECV, and determines whether the slave control unit 200 is normal according to the second monitor signal SL_RECV. Based on the same method in which the slave control unit 200 determines whether the master control unit 100 is normal, the master control unit 100 also monitors the second monitor signal SL_RECV according to a monitoring frequency corresponding to the second period P2, so as to confirm whether the potential of the second monitor signal SL_RECV changes.

If it is confirmed that the potential of the second monitor signal SL_RECV changes, according to the monitoring frequency of the second period P2 (i.e., the potential change occurs when the second duration T2 is not exceeded), it may be determined that the slave control unit 200 is normal, and the master control unit 100 sets the first control signal MA_CTRL to a logic low potential "L" to indicate a logic value "0". The first control signal MA_CTRL is directly transmitted to the slave control unit 200, and the first control signal MA_CTRL is transmitted to the logic determination unit 400 through the relay element 300 and the inverter 310. The relay element 300 is, e.g., a relay micro processing unit (relay MCU). The inverter 310 may invert the potential of the first control signal MA_CTRL, and has a function of a buffer to delay the first control signal MA_CTRL.

On the other hand, if the potential of the second monitor signal SL_RECV has not changed after the second duration T2, it is determined that the slave control unit 200 is abnormal. At this time, the master control unit 100 sets the first control signal MA_CTRL to logic low potential "H" to indicate a logic value "1".

Figure 4:
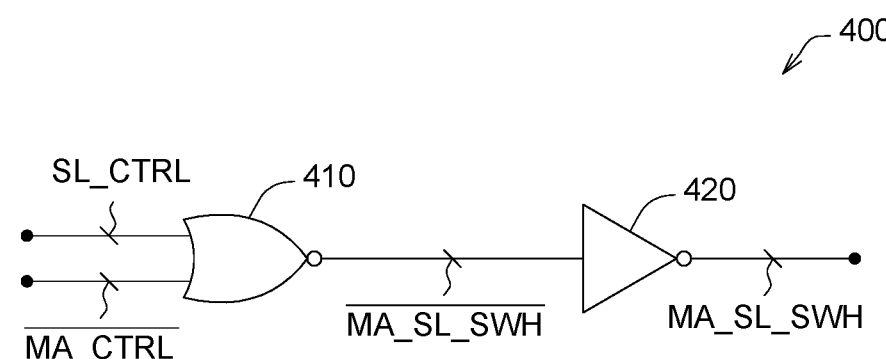
FIG. 4 is a circuit diagram of the logic determination unit of FIG. 2.

FIG. 4 is a circuit diagram of the logic determination unit 400 of FIG. 2. Please refer to FIGS. 2 and 4 to explain the operation of the logic determination unit 400. The logic determination unit 400 includes an XOR logic gate 410 and an inverter 420. The second control signal SL_CTRL is directly transmitted to the logic determination unit 400, and the first control signal MA_CTRL is transmitted to the logic determination unit 400 through the relay element 300 and the inverter 310.

The two input ends of the XOR logic gate 410 respectively receive the second control signal SL_CTRL and the first control signal MA_CTRL which is delayed and inverted. The output end of the XOR logic gate 410 generates a switch control signal MA_SL_SWH. The output of the XOR logic gate 410 performs an inverting, and it's inverted again through the inverter 420. When the slave control unit 200 confirms that the first monitor signal MA_RECV has changed and determines that the master control unit 100 is normal, the second control signal SL_CTRL is a logic value "0". Furthermore, the master control unit 100 also confirms that the second monitor signal SL_RECV has changed and determines that the slave control unit 200 is normal, hence the first control signal MA_CTRL is a logic value "0". At this time, the XOR logic gate 410 of the logic determination unit 400 receives the second control signal SL_CTRL with a logic value "0" and the first control signal MA_CTRL with a logic value "0". Therefore, the switch control signal MA_SL_SWH outputted by the XOR logic gate 410 is a logic value "0". The switch control signal MA_SL_SWH with a logic value "0" is outputted by the logic determination unit 400 and then sent to the first buffer 150 and the second buffer 250.

The first buffer 150 is associated with the master control unit 100, and the second buffer 250 is associated with the slave control unit 200. The first buffer 150 receives the switch control signal MA_SL_SWH and the first actuation signal MA_ACT generated by the master control unit 100. The second buffer 250 receives the second actuation signal SL_ACT generated by the slave control unit 200, and the switch control signal MA_SL_SWH is transmitted to the second buffer 250 through the inverter 320. The switch control signal MA_SL_SWH serves as a switch control signal for the first buffer 150 and the second buffer 250. When the switch control signal MA_SL_SWH is a logic value "0", the first buffer 150 is turned ON, and the first actuation signal MA_ACT may be provided to the motor unit 510 through the first buffer 150. On the other hand, the switch control signal MA_SL_SWH forms a signal 20) with logic value "1" through the inverter 320 and is inputted to the second buffer 250 such that the second buffer 250 is turned OFF. Hence, the second actuator signal SL_ACT cannot pass through the second buffer 250 to be provided to the motor unit 510. At this time, the motor unit 510 only receives the first actuation signal MA_ACT from the master control unit 100, i.e., only the master control unit 100 takes control authority of the motor unit 510.

On the other hand, if the potential of the first monitor signal MA_RECV does not change after the second duration T2, it is determined that the master control unit 100 is abnormal, and the slave control unit 200 sets the second control signal SL_CTRL to a logical value "1". At this time, the XOR logic gate 410 of the logic determination unit 400 receives the second control signal SL_CTRL with logic value "1" and the first control signal MA_CTRL with logic value "0". Therefore, the switch control signal MA_SL_SWH outputted by the exclusive OR logic gate 410 is logic value "1". When the switch control signal MA_SL_SWH is a logic value "1", the first buffer 150 is turned OFF, and the first actuation signal MA_ACT cannot be provided to the motor unit 510 through the first buffer

150. On the other hand, the switch control signal MA_SL_SWH is processed by the inverter 320 to form a signal with logic value "0", and is then inputted to the second buffer 250, such that the second buffer 250 is turned ON. Hence, the second actuator signal SL_ACT may pass through the second buffer 250 and then provided to the motor unit 510. At this time, the motor unit 510 only receives the second actuation signal SL_ACT from the slave control unit 200, i.e., only the slave control unit 200 controls the motor unit 510.

According to the above embodiment, when the master control unit 100 is normal, the switch control signal MA_SL_SWH is logic value "0", and the first actuation signal MA_ACT of the master control unit 100 may be provided to the motor unit 510 through the first buffer 150, while the second actuation signal SL_ACT of the slave control unit 200 is not provided to the motor unit 510. On the contrary, when the master control unit 100 is abnormal, the switch control signal MA_SL_SWH is logic value "1", and the second actuation signal SL_ACT of the slave control unit 200 may be provided to the motor unit 510 through the second buffer 250. Furthermore, the first actuation signal MA_ACT of the master control unit 100 is not provided to the motor unit 510. Therefore, the motor unit 510 is only controlled by one of the master control unit 100 or the slave control unit 200 at the same time, without causing confusion of control authority or excessive control of the master control unit 100 and the slave control unit 200, which may affect the flight status of the flight vehicle.

Figure 5:
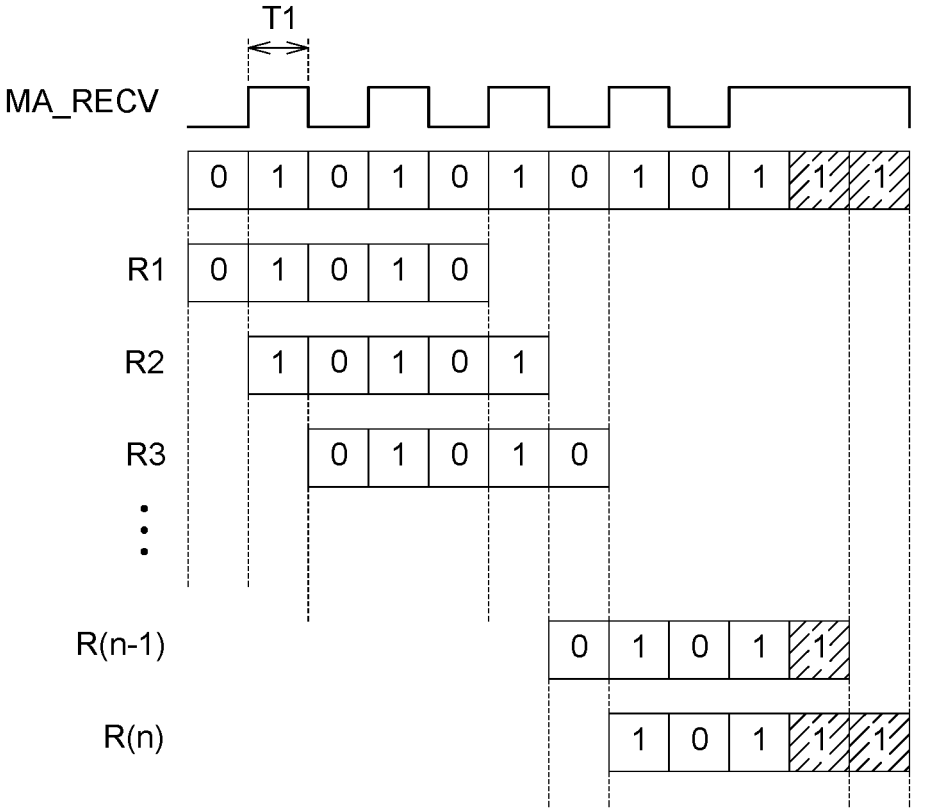
FIG. 5 is a schematic diagram of another embodiment in which the slave control unit confirms the potential change of the first monitor signal.

Next, please refer to FIG. 5, which is a schematic diagram of another embodiment in which the slave control unit 200 confirms the potential change of the first monitor signal MA_RECV. In this embodiment, the slave control unit 200 compares the number of logic values of "1" (i.e., high potential) and the number of logic values of "0" (i.e., low potential) of the first monitor signal MA_RECV, so as to confirm the master control unit 100 is normal. For example, taking the first duration T1 (i.e., 1 ms) of the first monitor signal MA_RECV as a time unit, five time units are taken as a monitor interval R1. In the monitor interval R1, the slave control unit 200 monitors that the logic values of the first monitor signal MA_RECV are "01010", which includes three logic values of "0" and two logic values of "1". The numbers of logical values 0" and "1" differ by one, hence it is determined that the master control unit 100 is normal.

Then, the monitor interval R1 is moved by one time unit to become the monitor interval R2. In the monitor interval R2, the slave control unit 200 monitors that the logic values of the first monitor signal MA_RECV are "10101", which includes three logic values of "1" and two logic values of "0". The numbers of logical values "0" and "1" differ by one, it is still determined that the master control unit 100 is normal. Likewise, the monitor interval R2 is moved by one time unit to become the monitor interval R3. In the monitor interval R3, the slave control unit 200 monitors that the logic values of the first monitor signal MA_RECV are "01010", which includes three logic values of "0" and two logic values of "1". The numbers of logical values "0" and "1" differ by one, it is still determined that the master control unit 100 is normal.

Then, in the monitor interval R(n−1), the logical values of the first monitor signal MA_RECV are "01011", which includes three logical values of "1" and two logical values of "0". The numbers of logical values "0" and "1" differ by one, it is still determined that the master control unit 100 is normal. Then, in the monitor interval R(n), the logical values of the first monitor signal MA_RECV are "10111", which include four logical values of "1" and one logical value of "0". The numbers of logical values "0" and "1" differ by three, hence, it is determined that the master control unit 100 is abnormal. The last two consecutive logic values of "11" within the logic values "10111" monitored in the monitor interval R(n) indicate that the potential of the first monitor signal MA_RECV has not changed, and the master control unit 100 is indeed abnormal. Therefore, erroneous judgement due to frequency or sampling time of the first monitor signal MA_RECV may be excluded.

As mentioned above, by comparing numbers of logic values of "1" and "0" of the first monitor signal MA_RECV, it may be correctly determined whether the master control unit 100 is abnormal, and erroneous judgement due to frequency or sampling time may be excluded. If the monitor interval is set as five times the first duration T1, the threshold for judging the comparison result may be set to "three". When the difference in the numbers of logical values "0" and "1" is greater than or equal to the threshold "three", the slave control unit 200 determines that the master control unit 100 is abnormal. Similarly, when the master control unit 100 confirms the potential change of the second monitor signal SL_RECV, the above mechanism may also be applied.

Figure 6:
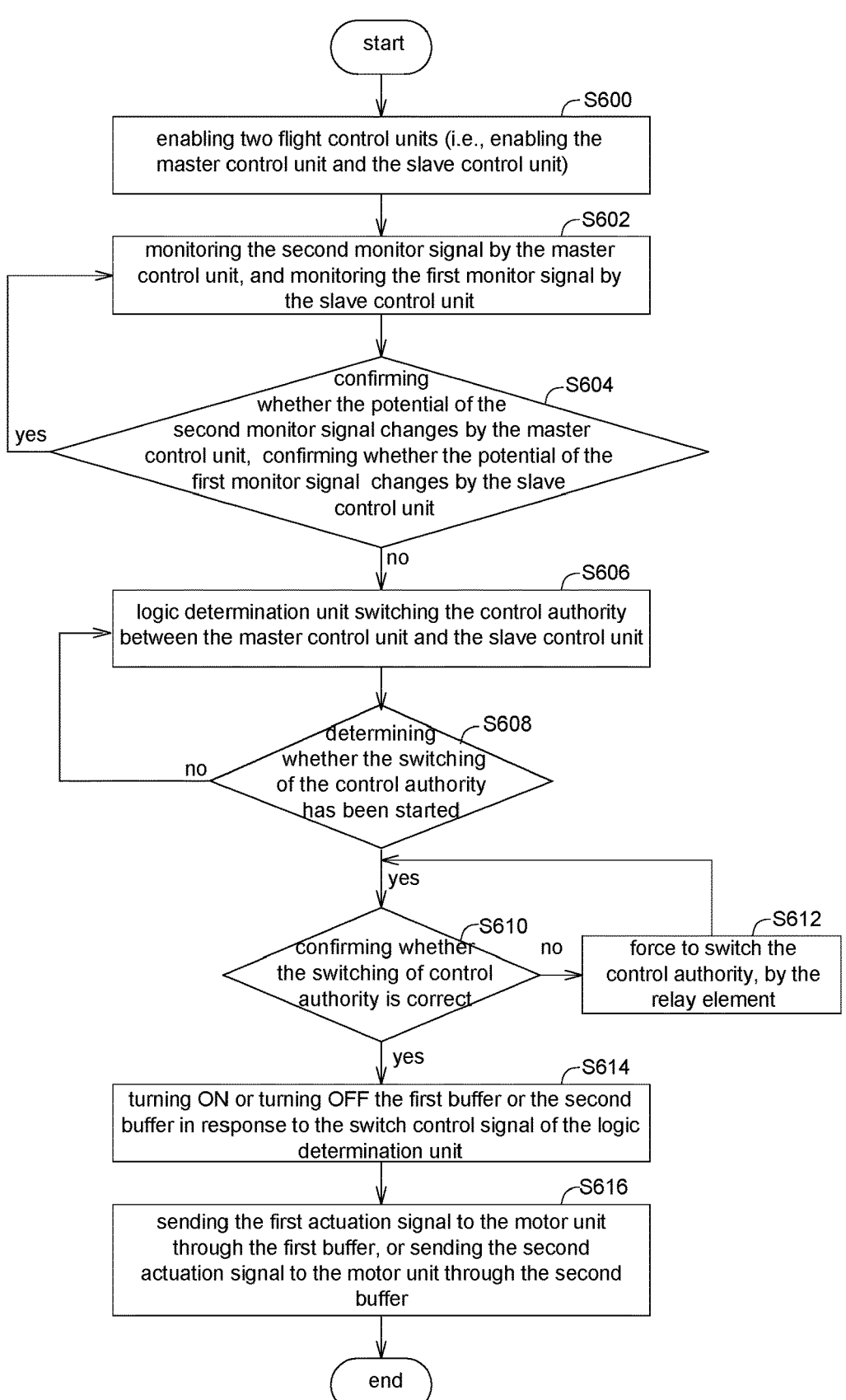
FIG. 6 is a flow chart for the control system performs control on the motor unit.

Next, please refer to FIG. 6, which is a flow chart for the control system 1000 performs control on the motor unit 510. First, in step S600, two flight control units 100*a* and 200*a* are enabled (i.e., the master control unit 100 and the slave control unit 200 are enabled). Next, in step S602, the master control unit 100 monitors the second monitor signal SL_RECV generated by the slave control unit 200, and the slave control unit 200 also monitors the first monitor signal MA_RECV generated by the master control unit 100.

Next, in step S604, the master control unit 100 confirms whether the potential of the second monitor signal SL_RECV changes, and the slave control unit 200 confirms whether the potential of the first monitor signal MA_RECV changes. If the confirmation result is "yes", return to step S602. If the confirmation result is "no" and it is determined that the master control unit 100 or the slave control unit 200 is abnormal, and then executing step S606: the logic determination unit 400 switches the control authority between the master control unit 100 and the slave control unit 200.

Next, in step S608, the master control unit 100 or the slave control unit 200 determines whether the switching of the control authority has been started. Next, in step S610, it is confirmed whether the switching of control authority is correct. If the confirmation result is "no", step S612 is executed: force to switch the control authority, by the relay element 300.

If the confirmation result of step S610 is "yes", then step S614 is executed: turning ON or turning OFF the first buffer 150 or the second buffer 250 in response to the switch control signal MA_SL_SWH of the logic determination unit 400. Next, in step S616, the first actuation signal MA_ACT is sent to the motor unit 510 through the first buffer 150, or the second actuation signal SL_ACT is sent to the motor unit 510 through the second buffer 250.

It will be apparent to those skilled in the art that various modifications and variations may be made to the disclosed embodiments. It is intended that the specification and examples be considered as exemplars only, with a true scope of the present disclosure being indicated by the following claims and their equivalents.

What is claimed is:

1. A control system, for controlling a flight vehicle, comprising:

a first buffer, coupled to a motor unit of the flight vehicle;

a second buffer, coupled to the motor unit;

a master control unit, for generating a first actuation signal, the first actuation signal is selectively provided to the motor unit through the first buffer;

a slave control unit, for generating a second actuation signal, the second actuation signal is selectively provided to the motor unit through the second buffer; and a logic determination unit, for generating a switch control signal to control the first buffer and the second buffer to be turned ON or turned OFF;

wherein the master control unit and the slave control unit monitor each other for abnormality, when the master control unit is abnormal, the second actuation signal is provided to the motor unit in response to the switch control signal.

2. The control system according to claim 1, wherein the master control unit and the slave control unit are both flight management units (FMU) of the flight vehicle.

3. The control system according to claim 1, wherein the master control unit and the slave control unit are both 32-bit micro control units (MCU).

4. The control system according to claim 1, wherein the master control unit generates a first monitor signal to the slave control unit, and the slave control unit determines whether the master control unit is abnormal based on the first monitor signal.

5. The control system according to claim 4, wherein the master control unit generates a first control signal, and the first control signal is provided to the logic determination unit through a relay element and an inverter.

6. The control system according to claim 5, wherein the slave control unit provides a second control signal to the logic determination unit, when the slave control unit determines that the master control unit is abnormal, the logic determination unit changes a potential of the switch control signal in response to the second control signal.

7. The control system according to claim 6, wherein the logic determination unit comprises an XOR logic gate, and the XOR logic gate generates the switch control signal based on the first control signal and the second control signal.

8. The control system according to claim 4, wherein the first monitor signal is a clock signal with a first period, and the first monitor signal changes between a first potential and a second potential based on a first duration, the first duration is equal to half of the first period.

9. The control system according to claim 8, wherein when the slave control unit confirms that the first monitor signal changes between the first potential and the second potential within a second duration, the slave control unit determines that the master control unit is normal, and the second duration is greater than the first duration.

10. The control system according to claim 9, wherein when the slave control unit confirms that the first monitor signal remains at the first potential or the second potential exceeding the second duration, the slave control unit determines that the master control unit is abnormal.

11. The control system according to claim 8, wherein the first potential of the first monitor signal indicates a first logic value and the second potential indicates a second logic value, and the first monitor signal has a first number of the first logical values and a second number of the second logical values in a monitor interval, when a difference between the first number and the second number is greater than a threshold, the slave control unit determines that the master control unit is abnormal.

12. A control method, for controlling a flight vehicle, comprising:

generating a first actuation signal, by a master control unit;

selectively providing the first actuation signal to a motor unit, by a first buffer;

generating a second actuation signal, by a slave control unit;

selectively providing the second actuation signal to the motor unit, by a second buffer; and generating a switch control signal to control the first buffer and the second buffer to be turned ON or turned OFF, by a logic determination unit;

wherein the master control unit and the slave control unit monitor each other for abnormality, when the master control unit is abnormal, the second actuation signal is provided to the motor unit in response to the switch control signal.

13. The control method according to claim 12, wherein the master control unit and the slave control unit are both flight management units (FMU) of the flight vehicle.

14. The control method according to claim 12, wherein the master control unit and the slave control unit are both 32-bit micro control units (MCU).

15. The control method according to claim 12, further comprising:

generating a first monitor signal to the slave control unit, by the master control unit; and determining whether the master control unit is abnormal based on the first monitor signal, by the slave control unit.

16. The control method according to claim 15, further comprising:

generating a first control signal, by the master control unit; and providing the first control signal to the logic determination unit through a relay element and an inverter.

17. The control method according to claim 16, further comprising:

providing a second control signal to the logic determination unit, by the slave control unit; and when the slave control unit determines that the master control unit is abnormal, changing a potential of the switch control signal in response to the second control signal by the logic determination unit.

18. The control method according to claim 17, wherein the logic determination unit comprises an XOR logic gate, and the XOR logic gate generates the switch control signal based on the first control signal and the second control signal.

19. The control method according to claim 15, wherein the first monitor signal is a clock signal with a first period, and the first monitor signal changes between a first potential and a second potential based on a first duration, the first duration is equal to half of the first period.

20. The control method according to claim 19, further comprising:

confirming a potential change of the first monitor signal within a second duration by the slave control unit, wherein the second duration is greater than the first duration; and when confirming that the first monitor signal changes between the first potential and the second potential within the second duration, determining that the master control unit is normal by the slave control unit.

21. The control method according to claim 20, wherein when confirming that the first monitor signal remains at the first potential or the second potential exceeding the second duration, the slave control unit determines that the master control unit is abnormal.

22. The control method according to claim 19, wherein the first potential of the first monitor signal indicates a first logic value and the second potential indicates a second logic value, and the control method further comprising:

calculating a first number of the first logical values and a second number of the second logical values of the first monitor signal in a monitor interval;

calculating a difference between the first number and the second number; and comparing the difference with a threshold;

when the difference is greater than the threshold, determining that the master control unit is abnormal by the slave control unit.

* * * * *